Nov. 20, 1945.　　　A. P. TERRY　　　2,389,468
FASTENER FOR DUCT FORMS AND THE LIKE
Filed April 12, 1943
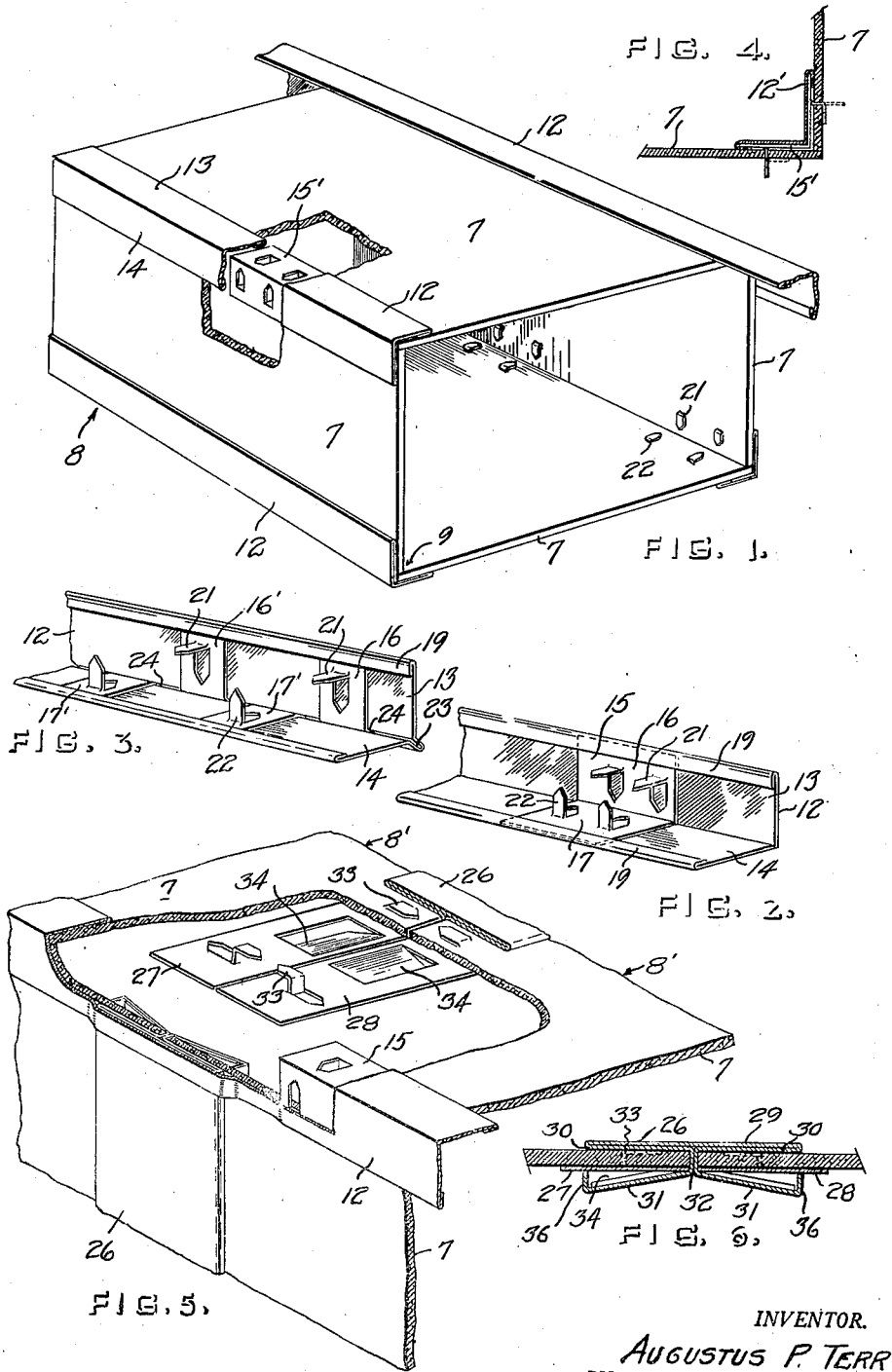
INVENTOR.
AUGUSTUS P. TERRY
BY Gardner & Warren
his attys.

Patented Nov. 20, 1945

2,389,468

UNITED STATES PATENT OFFICE 2,389,468

FASTENER FOR DUCT FORMS AND THE LIKE

Augustus P. Terry, Berkeley, Calif.

Application April 12, 1943, Serial No. 482,713

4 Claims. (Cl. 138—74)

The invention relates to fasteners such as for securing together sheets of material in the formation of a heating or ventilating duct in buildings and the like. The fasteners are particularly designed for use with asbestos or other sheeting material which may be comparatively readily pierced by members in the form of prongs associated with the fasteners. In a previously filed application, I disclosed fasteners of a form and nature which would eliminate the need of handling and manipulating separate piercing, securing, and body parts, and yet provide for an extremely effective attachment of the sheets or walls. The present invention concerns not only the securing of the walls, but has as one of its main objects the sealing and protection of the walls at the joints therebetween.

Another object of the invention is to provide fastening means of the character described in which the securing members are combined with the means for sealing and protecting the joints between the walls.

A further object of the invention is to provide a means of the character described in which the securing members are adjustably carried by the joint sealing and protecting portions, and further the securing members will be effectively reenforced by said portions.

A still further object of the invention is to provide in connection with the fastening means for the walls, a means of securing adjoining sections of the duct together which will cooperate with the wall fastening means at the joints between the sections and permit the application of said fastening means to such joints as effectively as to the intermediate portions of the sections.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view with parts broken away showing the wall fastening means of my invention as applied to a duct section.

Figure 2 is a perspective view of one of the fastener units of my invention.

Figure 3 is a view similar to Figure 2 but showing a somewhat modified form of fastener unit.

Figure 4 is a view similar to Figure 2, and showing a still further modified form of fastener unit.

Figure 5 is a perspective view, with parts broken away, showing the wall securing and section connecting means of my invention as applied to adjoining sections of a duct.

Figure 6 is a detail cross-sectional view of the means for securing together the adjacent ends of adjoining duct sections.

As above explained, the fastening means of my invention is here shown as utilized for securing together side walls 7 to form one or more sections 8 and 8' of a duct. The type of duct with which my fastener is particularly useful, at least in so far as the illustrated embodiments are concerned, is that in which the walls of the duct are formed of a material such as asbestos sheeting, sheet rock, which may be pierced by a prong or the like with application of hard pressure. The ducts are usually formed of polygonal cross section, the sections as shown in the drawing being provided with four walls arranged in rectangular form. These walls meet at their longitudinal edges to form corners 9, and there is provided at such corners preferably for at least the full length of the sections, corner strips 12 formed with angularly related integral portions 14 which correspond with the angular relation of the walls against which the portions are positioned. The strips 12 are preferably formed of sheet metal and of a thickness which will permit of some flexing of the portions so that latter may be caused to firmly engage the contiguous walls.

In the form of the invention exemplified in Figures 1, 2 and 3, the corner strip is arranged for application to the exterior of the duct walls, and means are provided on the inner side of the strip, that is the side designed to lie against the walls, for securing together the adjoining walls engaged by the strip. Such means, as is probably most clear in Figure 2, comprises one or more angle plates 15 having portions 16 and 17 related angularly corresponding to and positioned on the corner strip portions 13 and 14. The plates 15 are designed to be adjustably held on the strip and for this purpose the outer longitudinal edges of the strip are folded over and upon the inner sides of the strip to form flanges 19 which frictionally hold the outer edges of the plates against the strip portions and provide guideways for movement of the plate longitudinally on the strip. As will be clear, with this arrangement the fastener plates may be positioned as desired on the strip, a plate may be readily inserted on the strip or removed therefrom, and as many plates as desired to suit a particular situation, may be supplied on the strip. On each of the plate portions, there are provided wall pentrating members, here shown in the form of integral prongs 21 and 22 which are formed in a manner similar to that disclosed in my copending application, Serial No. 471,677, aforesaid. The prongs are forced through the walls and a portion thereof is clenched upon the inner side of the walls as shown in Figure 1. Since the prongs extend angularly from the plate portions, and the prongs of one plate extend toward the prongs of the other plate, it is preferable that the complete operative atachment of a wall with one of the plate portions be effected before the adjoining wall is placed over the contiguous plate portion.

It will be evident that when the prongs are operatively fastened to the walls, the plates will firmly secure the adjoining walls of the duct together, and at the same time the plates will securely hold the corner strips in position so as to cover or seal the joint between the walls and provide an effective protection for the edges of the walls for the entire length of the section. The plates are preferably formed of sheet metal, but of a heavier gauge than the corner strips.

In Figure 3, a somewhat modified form of the invention is illustrated. In this embodiment, the plate portions 16' and 17' corresponding to the portions 16 and 17 of the first described embodiment are formed as separate members rather than as an integral member. With this arrangement, the plate portions are preferably disposed in staggered relation on the corner strip, and the latter is provided at the juncture of the strip portions with a groove 23 in which the edges 24 of the plate portions 16' and 17' are guided and held.

In the further modified embodiment illustrated in Figure 4, the corner strip 12' is arranged to be positioned interiorly instead of exteriorly of the duct; and the plates 15' are disposed on the outer side of the strip that is the side on which the greater angle is defined between the strip portions, so that plates may be interposed between the strip and the walls. In this embodiment the flanges for holding the plates in position are located on the side of the strip on which the plates are positioned, and likewise the prongs on the plates are extended outwardly from the associated plate portion so that the prongs may be projected through the walls and clinched on the outer side.

In Figures 5 and 6, I have shown the fastener means of my invention as applied not only for securing together the walls of one section, but for securing together the walls of adjoining sections. Included in this arrangement is a means for securing and sealing the joints between the ends of the walls of the adjoining sections, and such means at the corners of the duct are arranged like the fastener plates 15 to be inserted within and covered by the corner strips. The corner strips it will be understood may in any arrangement be limited in length to that of the individual section, or the strips may be made long enough so as to extend continuously from one section to the other and over the joint between the sections. Strips of different lengths are illustrated in Figure 1, and in the case as in Figure 5, where the means securing and covering the joints between the sections are arranged to be inserted under the corner strips, the latter are preferably formed to extend as a continuous member over the joints. The means for securing the sections and covering the joints is here shown in the form of members 26, 27, and 28, the member 26 being designed to enclose individually the ends of the adjacent walls and to cover the crack therebetween and at the same time secure such ends together by a snap attachment made with the members 27 and 28. The member 26 as will be clear from Figure 6, is here shown formed of a single piece of sheet material, preferably metal, having portions arranged to lie on opposite sides of the walls and portions connecting such first portions and arranged to extend between the ends of the walls. One of the first portions is formed of an intermediate part of the member and comprises a flat band 29 and band portions 30 which are folded under and upon the band 29 and designed to engage the outer surface walls. The other of said first portions comprise wings 31 which are arranged to overlie the inner surface of the walls and are connected with the band portions 30 by portions 32 arranged to extend between the wall ends. The members 27 and 28 are positioned on the inner side of the walls and are in the form of metal strips preferably secured to the walls by means of prongs 33 and provided with struck-out tongues 34 designed to be engaged by hook ends 36 on the wings 31. In applying the members 26, 27, and 28, the members 27 and 28 are first secured to the walls, and the latter then inserted and advanced between the band portions until the hook ends snap over become locked in position by the ends of the tongues, the wings or the tongue, being resilient and so positioned that a quick and effective locking action is assured. It will be seen that since the band and band portions are flat and thin, they may be readily inserted under the corner strip and an angle plate without materially bending or displacing either of the latter members.

I claim:

1. In a fastening means for securing in angular relation the walls of a duct or the like, a wall fastener member having integral portions angularly related to correspond to the walls, and having wall penetrating means on the inner sides of the portions, and an edging strip in which said member is adjustably held for longitudinal displacement along said strip and having angularly related portions providing a backing for said member portions and arranged to engage said walls beyond the ends of said portions.

2. In a fastener means for securing in angular relation the walls of a duct or the like, a corner strip having angularly related portions arranged to engage said walls, and wall fastener parts comprising angularly related portions slidably and frictionally held for longitudinal displacement therein, each of said latter portions a side engagable with said walls and having wall penetrating means on said side.

3. In a fastener for securing together in angular relation the walls of a duct section, a corner strip corresponding in length to the section and having portions angularly related corresponding to the walls, fastener means comprising parts related angularly corresponding to said strip portions and slidably positioned on the inner sides thereof, means on the outer longitudinal edges of said portions frictionally holding and guiding said parts for slidable movement on said portions, and wall penetrating members on said parts extending away from the associated strip portions.

4. In a fastener for securing together in angular relation the walls of a duct section, a corner strip corresponding in length to the section and having portions angularly related corresponding to the walls, fastener means comprising parts related angularly corresponding to said strip portions and slidably positioned on the inner sides thereof, an inwardly extending flange on the outer longitudinal edges of said strip portions providing a guide and clamp for holding said parts against said portions, and wall penetrating means extending angularly from said parts.

AUGUSTUS P. TERRY.